Dec. 6, 1960 HIROSHI AMEMIYA 2,963,688

SHIFT REGISTER CIRCUITS

Filed May 15, 1958

INVENTOR.
HIROSHI AMEMIYA
BY Morris A. Rabkin
ATTORNEY

United States Patent Office 2,963,688

Patented Dec. 6, 1960

2,963,688

SHIFT REGISTER CIRCUITS

Hiroshi Amemiya, Haddonfield, N.J., assignor to Radio Corporation of America, a corporation of Delaware Filed May 15, 1958, Ser. No. 735,574

6 Claims. (Cl. 340—174)

This invention relates to shift register circuits, and particularly to shift register circuits of the type using transistors and magnetic cores.

Shift register circuits are often used in systems for the storing of a pattern of information signals. After storage, the pattern of information signals may appear sequentially at the output of the circuit for further use in a larger system. Shift register circuits also are used in counting applications in the manner of a ring counter, that is a timing signal may be repeatedly circulated around the shift register. Certain of the type shift registers using magnetic cores and transistors provide advantages, for example, in the reduction of power required to shift the pattern of information signals. Thus, the shift current need be sufficient only to partially drive the cores from remanence in one direction towards saturation in the opposite direction. A partially driven core induces a signal in a winding to activate the coupled transistor. Once the transistor is activated, the shift current can be removed. In these prior art circuits, however, four separate windings are used in operating each of the cores of the shift register. It is desirable from the standpoint of economy, size and operation to reduce the number of windings needed in constructing the circuit.

It is an object of the present invention to provide improved shift register circuits of the type referred to in that fewer windings are required.

Another object of the present invention is to provide improved shift register circuits of the type referred to which are simpler to construct than prior shift register circuits of similar types.

According to the present invention, transistors of complementary type are used in alternate ones of the shift register stages. A pair of windings on successive shift register cores are coupled in regenerative fashion to respective ones of the transistors. A third winding on each core is used to shift the information stored in the shift register. Because complementary type transistors are used in adjacent shift register stages, the senses of linkage of the pair of windings on one core is opposite from the senses of linkage of the corresponding pair of windings on the immediately adjacent cores. The operation of the shift register of the invention is similar to that of the prior magnetic core transistor, shift register circuits.

Figures 1, 2:
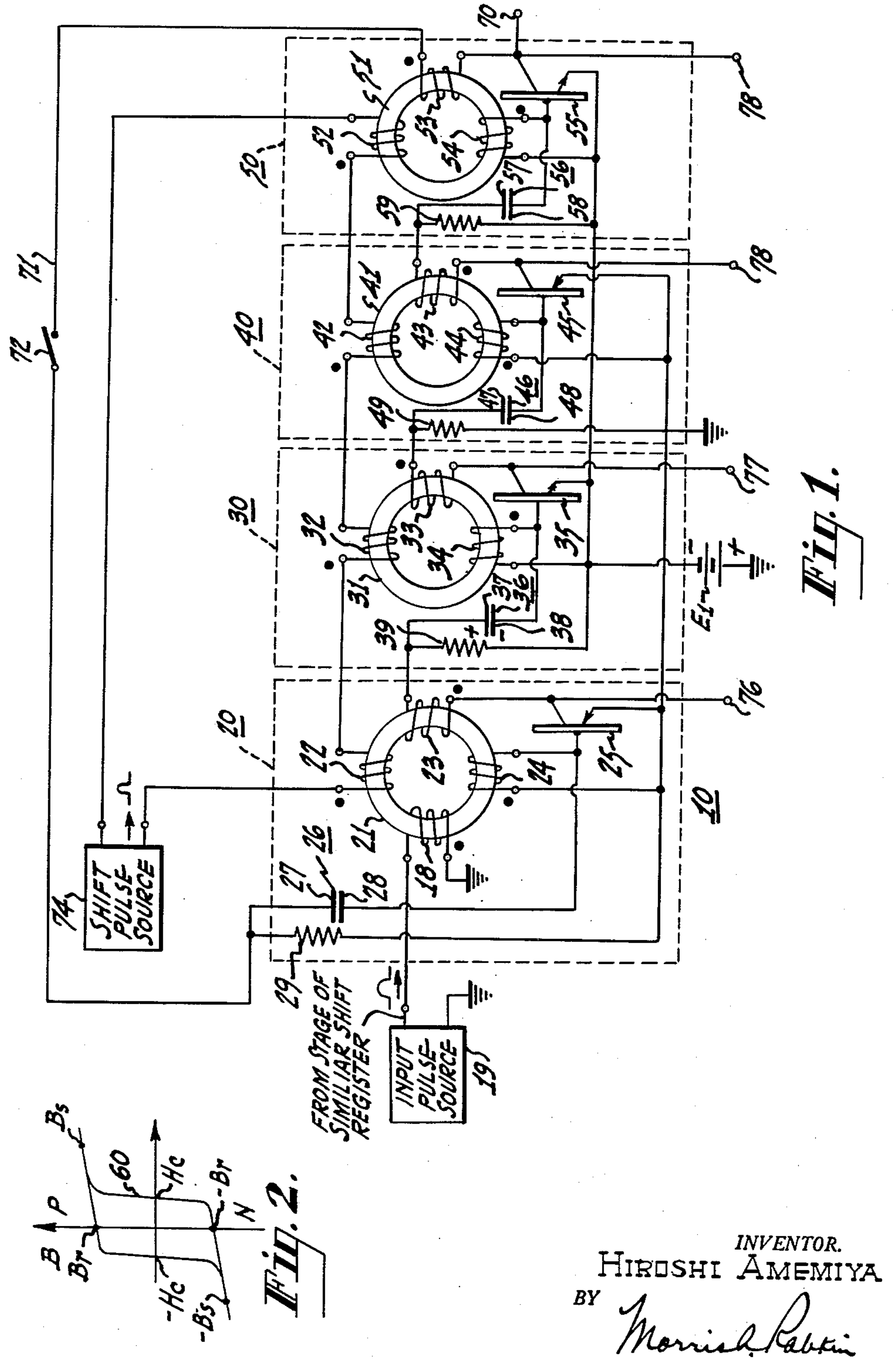
Fig. 1 is a schematic diagram of a shift register according to the invention.
Fig. 2 is a graph, somewhat idealized, of a hysteresis characteristic of a core suitable for use in the shift register circuit of Fig. 1.

The shift register 10 of Fig. 1 has two or more stages, for example, as illustrated, four separate stages 20, 30, 40 and 50, each stage being used for storing a separate binary signal. The first and third stages, 20 and 40, are similar to each other and second and fourth stages, 30 and 50, are similar to each other. Because of the similarity, only the first and second stages, 20 and 30, are described in detail.

The first stage 20 includes a magnetic core 21 of substantially rectangular hysteresis loop material having three windings linked thereto. The first winding 22 is a shift winding. The second winding 23 is an output winding, and the third winding 24 is an input winding. The first stage 20 also includes a second input winding 18 connected to an input pulse source 19. The input pulse source 19 supplies input signals to be stored in and shifted by the shift register. The conventional dot notation is used to indicate the relative senses of linkage of the windings to the core 21 and the polarities of the induced voltages. A positive (conventional) current flowing into the winding at the dot terminal changes or tends to change a core to saturation in one of its two remanent states, say the state P. The saturated conditions of a core in the states P and N are represented by the points $B_s$ and $-B_s$ respectively of the hysteresis curve 60 of Fig. 2. When the applied current is removed from the core winding, the core returns to one of the remanent conditions in the states P and N represented by the points $B_r$ and $-B_r$ respectively of the curve 60. Positive (conventional) current flowing into the winding at the non-dot terminal of a core winding changes or tends to change a core to the $-B_s$ saturated condition in the state N.

Relatively little flux change is produced in a core when the core changes between remanence and saturation in the same state. A relatively large flux change is produced when a core changes from remanence in one state to saturation in the opposite state. The applied current must generate a magnetizing force in excess of a coercive force $\pm H_c$ in order to change a core from one state to the other state.

The output and input windings 23 and 24 of the core 21 are coupled in regenerative fashion, to a transistor 25 of one conductivity type, say the PNP type. The collector electrode of the transistor 25 is connected to the dot terminal of the output winding 23. The base electrode of the transistor 25 is connected to the non-dot terminal of the input winding 24. The emitter electrode of the transistor 25 is connected to a reference potential, indicated in the drawing by the conventional ground symbol. The dot terminal of the input winding 24 also is connected to ground. In the case of a ring counter type operation, input signals may be coupled to the input winding 24 of the core 21 via a temporary-storage capacitor 26 having one plate 28 connected to the non-dot terminal of the input winding 24 and having its other plate 27 connected to the output of the last stage of the shift register. A discharge resistor 29 for the temporary storage capacitor 26 is connected across the series combination of the temporary storage capacitor 26 and the input winding 24.

The second stage 30 is coupled to receive the output of the first stage 20. A transistor 35 of the NPN conductivity type is used in operating the core 31 of the second stage 30. Reference numerals between 30 and 40 are used to designate the elements of the stage 30. The unit digits of these reference numerals correspond to the unit digits of the reference numerals used to designate similar elements of the first stage 20. The senses of linkage of the output and input windings 33 and 34 of the second stage core 31 are opposite from those of the output and input windings 23 and 24 of the first stage core 21. The non-dot terminal of the input winding 34 is connected to the negative terminal of a supply source E1. The positive terminal of the supply source E1 is connected to ground.

The plate 37 of the storage capacitor 36 is connected to the non-dot terminal of the output winding 23 of the core 21 of the first stage 20. The discharge resistor 39 for the capacitor 36 of the second stage 30 is connected across the series combination of the capacitor 36 and the input winding 34.

The dot terminal of the output winding 33 is coupled to the temporary storage capacitor 46 of the third stage 40. The arrangement and operation of the third stage 40 is the same as the first stage 20 except that the other input winding 18 for receiving inputs signals from an external source is not required. The output signal from the third stage 40 is coupled to the input of the fourth stage 50. The output from the shift register may be taken by way of an output terminal 70 connected to the collector electrode of the transistor 55.

In the ring counter type operation, the dot terminal of the output winding 53 of the last shift register stage 50 is connected to the temporary storage capacitor 26 of the first stage 20 by a feedback line 71. A single-throw, single-pole switch 72 may be connected in the feedback line 71. In the shift register type operation, the switch 72 is open; and in the ring counter type operation, the switch 72 is closed.

The shift windings 22, 32, 42 and 52 are connected in series with each other by connecting the non-dot terminal of one winding to the dot terminal of the succeeding shift winding. The dot terminal of the first stage 20, shift winding 22 and the non-dot terminal of the last stage 50, shift winding 52 are connected to the output terminals of a source 74 of shift pulses.

In operation, the transistors of each of the shift register stages are normally in their non conductive condition. Both the emitter and base electrodes of each transistor are at the same D.C. potential. Only one supply source E1 is needed because the successive stages of the shift register are A.C. coupled to each other by the temporary storage capacitors. Therefore, the D.C. voltage level of any stage does not influence the adjacent stages.

During operation, each of the cores of the shift register may be in either one of the two remanent states, P and N. The two states P and N of a core correspond to the storage of the two binary signals "0" and "1." At the start of an operation, all the cores are in one remanent state, say the state P.

Assume now that the input pulse source 19 is operated to apply a positive input signal to the second input winding 18 of the first stage core 21. The positive current flow into the non-dot terminal of the second input winding 18 sets the first stage core 21 to the state N. Preferably, the input signals are of the rounded type. The flux change in the core 21 induces a voltage across the first input winding 24 in a direction to make the non-dot terminal positive relative to the dot terminal. Accordingly, the transistor 25 remains non-conductive. A voltage is also induced in the shift winding 22 of the core 21. However, no current flow is produced because the shift pulse source 74 is effectively open-circuited at this time.

At any later time, the shift pulse source 74 is operated to apply a positive shift pulse to the shift windings 22, 32, 42 and 52. Positive current flow into the dot terminal of the shift winding 22 changes the core 21 from the N ($-Br$ remanent) condition towards the $Bs$ saturated condition. The flux change in the core 21 produces a voltage in the first input winding 24 in a direction to forward bias the emitter-base diode of the transistor 25. Accordingly, the transistor 25 is driven into conduction. A resulting current flows in the emitter-collector path of the transistor 25 and into the dot terminal of the output winding 23. The current flow in the output winding 23 applies a further magnetizing force to the core 21 in a direction to aid the shift magnetizing force. An additional flux change is produced which further forward biases the emitter-base diode of the transistor 25, which in turn produces a further current flow in the output winding 23. The action continues in regenerative fashion until the core 21 is driven to the $Bs$ saturated condition.

The shift current may be terminated at any time after the transistor 25 is driven into conduction.

The current flow in the output winding 23 of the core 21 charges the temporary storage capacitor 36 of the second stage 30 in a direction to make its upper plate 37 positive relative to its lower plate 38. The charging current for the capacitor 36 flows in the input winding 34 of the second stage core 31 from the dot terminal to the non-dot terminal.

The shift current applied to the shift winding 32 of the second stage core 31 drives the core 31 from remanence to saturation in the original state P. The flux change in the core 31 induces a voltage across the input winding 34 in a direction to make the dot terminal positive relative to the non-dot terminal. This induced voltage applies a positive bias to the base electrode of the transistor 35 in a direction to make the transistor 35 conduct. A positive bias is also applied to the base electrode of the transistor 35 due to the switching of the first stage core 21. However, no appreciable current flows in the emitter-collector path of the transistor 35 because the core 31 is already in the P state. Accordingly, upon termination of the shift current, the temporary storage capacitor 36 is charged with the upper plate 37 positive relative to the lower plate 38 and all the cores are in their original remanent states P. The capacitor 37 then discharges through the discharge resistor 39 and the input winding 34 of the second stage core 31 from the non-dot to the dot terminal. The current flow in the input winding 34 changes the second stage core 31 from its $Br$ remanent condition to its saturated condition $-Bs$ in the state N. After the discharge current ends, the core 31 is in the $-Br$ remanent condition in the state N, thereby representing the storage of the original binary "1" input signal. The transistor 35 remains non-conductive during the discharge of the capacitor 36 because its base-emitter diode is reversed biased.

A new input signal representing a binary "1" can be applied by the input source 19 at any time after the second stage core 31 is in the $-Br$ remanent condition. The new input signal changes the first stage core 21 to its $-Br$ remanent condition in the manner described for the original input signal.

A new shift signal then changes the cores 21 and 31 of the first and second stages of the shift register from their $-Br$ conditions to their $Bs$ conditions. The binary "1" signal stored in the first stage core 21 is transferred to the second stage core 31 in the manner previously described. The binary "1" signal stored in the second stage core 31 is transferred to the third stage core 41. As described above, the shift current induces a voltage across the input winding 34 of the core 31 in a direction to make the transistor 35 conduct. Now, because the core 31 was initially in $-Br$ remanent condition, the transistor 35 conducts in regenerative fashion driving the core 31 to the $Bs$ condition. The capacitor 46 charges in a direction to make its lower plate 48 positive relative to its upper plate 47. The capacitor 46 then discharges through the discharge resistor 49 and the input winding 44 to change the core 41 to its $-Br$ remanent condition.

A binary "0" is stored in the first stage core 21 by omitting the application of the input signal to the input winding 18 of the first stage core 21. Therefore, the core 21 remains in its original $Br$ condition. A subsequent shift signal does not produce any appreciable flux change in the core 21. Accordingly, when the shift signal is ended, both the cores 21 and 31 remain in the $Br$ remanent condition. Thus, the binary "0" signal is transferred to the second stage core 31. Any desired pattern of binary "1" and "0" information signals may be stored and transferred in the shift register 10 in similar fashion by alternately applying shift and binary input signals.

In the arrangement of Fig. 1, any input signal applied to the core 21 is delivered at the output terminal 70 after four shift signals have been applied. The information received serially from the input pulse source 19 may be converted to parallel form by the shift register by means of parallel output terminals 76, 77, 78 and 79 each connected to the collector electrode of a different transistor. Inverter circuits may be used in conjunction with alternate ones of the shift register stages to provide parallel output signals of one polarity.

The ring counter type operation is similar to that of the shift register except that only a single information signal ("1" or "0") is shifted. Thus, at any one time, all the cores except one are in like remanent states. A shift signal changes the one core from the one to the other state, thereby causing the succeeding core to change from the other to the one state. The information signal is repeatedly circulated around the register by closing the switch 72 in the feedback line 71.

There have been described herein improved shift register circuits of the magnetic core-transistor type using fewer windings than similar prior art circuits.

What is claimed is:

1. A shift register circuit comprising first and second cores of rectangular hysteresis loop magnetic material, an input, an output and a shift winding on each of said cores, first and second transistors of opposite conductivity types for operating said cores, said transistors each having base, emitter, and collector electrodes, said input and output windings of each core being connected in regenerative fashion to a different said transistor, a temporary storage capacitor connecting the output winding of said first core to the input winding of said second core, and a discharge resistor for said capacitor connected across the series combination of said capacitor and the input winding of said second core.

2. In a magnetic core-transistor circuit, the combination comprising first and second cores of rectangular hysteresis loop material, first and second transistors of opposite conductivity types, input and output windings for each said core coupled in regenerative fashion to a different one of said transistors, a temporary storage capacitor, a charging circuit for said capacitor including the output winding of said first core and the input winding of said second core, and a discharge circuit for said capacitor including a resistance element and the same input winding of said second core.

3. In a shift register circuit of the magnetic core transistor type, the combination of a plurality of magnetic cores of rectangular hysteresis loop material, separate input and output windings on each of said cores, a plurality of transistor devices a different one for each said core, said input and output windings of any one core being coupled in regenerative fashion to the transistor device for that core, successive ones of said transistor devices being of opposite conductivity types, a plurality of temporary storage capacitors for coupling any one core to the next succeeding core, a plurality of charging circuits for said capacitors, each said charging circuit including the output winding of any one core and the input winding of the next succeeding core, and a plurality of discharge circuits for said capacitors, each said discharge circuit including a resistance element and the said input winding of the next succeeding said core.

4. In a shift register circuit of the magnetic core transistor type, the combination as claimed in claim 3, said cores being arranged in ordered fashion, one of said charging circuits including the output winding of the last one of said cores and the input winding of the first one of said cores, and one of said discharge circuits including the said input winding of the first one of said cores.

5. In a shift register circuit of the magnetic core transistor type, the combination as claimed in claim 3, said cores being interconnected in ordered fashion, and the first one of said cores having an additional winding linked thereto for receiving input pulses from an external source.

6. In a shift register circuit of the magnetic core transistor type, the combination of first and second cores each having two remanent states and each having input, output and shift windings linked thereto, a first transistor of one conductivity type and a second transistor of the opposite conductivity type, said input and output windings of said first core both being linked thereto in the same one sense and connected to said first transistor in regenerative fashion, said input and output windings of said second core both being linked thereto in the sense opposite the one sense and connected to said second transistor in regenerative fashion, a temporary storage capacitor, a charging circuit for said capacitor including the output winding of said first core and the input winding of said second core, a discharge circuit for said capacitor including a discharge resistor and the said input winding of said second core, means for applying an input signal to said first core input winding to change said first core from an initial to the other of said two states, and means for applying a shift signal to said shift windings in a direction to change both said cores to said initial states, the voltage induced in said first core input winding driving said first transistor into saturation thereby charging said capacitor, said capacitor subsequently discharging through the input winding of said second core to change said second core from said initial to the said other of said states.

References Cited in the file of this patent

UNITED STATES PATENTS

| | | |
|---|---|---|
| 2,591,406 | Carter | Apr. 1, 1952 |
| 2,747,110 | Jones | May 22, 1956 |

OTHER REFERENCES

"A Transistor Magnetic Core Circuit," Guterman and Carey, IRE Convention Record, part 4, March 21–24, 1955, pp. 84–94.